United States Patent [19]

Bloys et al.

[11] Patent Number: 4,953,620

[45] Date of Patent: Sep. 4, 1990

[54] ACCELERATING SET OF RETARDED CEMENT

[75] Inventors: J. Benjamin Bloys, Plano; Robert B. Carpenter, Hurst; William N. Wilson, Plano, all of Tex.

[73] Assignee: Atlantic Richfield Company, Los Angeles, Calif.

[21] Appl. No.: 393,546

[22] Filed: Aug. 14, 1989

[51] Int. Cl.$^5$ .................. E21B 33/138; E21B 33/14; E21B 33/16

[52] U.S. Cl. .................. 166/293; 106/719; 106/803; 166/291; 166/300

[58] Field of Search .................. 166/293, 291, 300; 106/90, 314, 315

[56] References Cited

U.S. PATENT DOCUMENTS

| | | | |
|---|---|---|---|
| 3,482,634 | 12/1969 | Cox | 166/300 X |
| 3,605,898 | 9/1971 | Harrison et al. | 166/293 |
| 4,261,755 | 4/1981 | Berry et al. | 106/315 X |
| 4,276,182 | 6/1981 | Beirute | 166/291 X |
| 4,419,138 | 12/1983 | Popovics | 106/315 X |
| 4,502,887 | 3/1985 | Tsuda | 106/315 X |
| 4,519,452 | 5/1985 | Tsao et al. | 166/293 X |
| 4,548,270 | 10/1985 | Eilers | 166/300 X |
| 4,769,077 | 9/1988 | Crocker | 106/90 |
| 4,838,352 | 6/1989 | Oberste-Padtberg et al. | 166/291 |

*Primary Examiner*—George A. Suchfield
*Attorney, Agent, or Firm*—James C. Fails; Arthur f. Zobal; Geoffrey A. Mantooth

[57] ABSTRACT

What is disclosed is a method of accelerating the set of a retarded cement. The cement may range from a drilling fluid containing dispersants or retarders that will slow down the set of the drilling fluid when cementitious fluid is added thereto, through overwashing, or treating a retarded primary or remedial cement that may have been injected into fractures or areas within a well to overwashing a plug or any volume of retarded cement that needs to be set in a well.

The specific uses are discussed.

7 Claims, No Drawings

ACCELERATING SET OF RETARDED CEMENT

FIELD OF THE INVENTION

This invention relates to cementing oil and gas wells. More particularly, this invention relates to accelerating set of cement that is highly retarded; such as, retarding drilling fluid converted to cement; or retarded conventional cements, including cement slurries that might commingle with a drilling fluid or otherwise become contaminated with a retarding chemical.

BACKGROUND OF THE INVENTION

The prior art is replete with a wide variety of both inorganic and organic cement accelerators. In a copending application, Ser. No. 07/131,878, now U.S. Pat. No. 4,883,125 entitled "CEMENTING OIL AND GAS WELLS USING CONVERTED DRILLING FLUID" of which the present co-inventors are co-inventors and having the same assignee, there was discussed the completion of oil and gas wells by converting of a drilling fluid, or "mud", to a cement, and several patents were cited therein which disclose compositions for accomplishing this.

In that application it was noted that efforts to convert drilling fluid containing cementitious materials have posed problems such as increased viscosity due to flocculation as cementitious material is added to the drilling mud, and subsequently pumped into the wellbore. Therein was cited U.S. Pat. No. 3,499,491, which describes difficulties with gelling characteristics and, particularly, temperature sensitivity.

In both primary and remedial applications, it is also sometimes desirable to set retarded cement formulations more rapidly. Typically cement is retarded for pumping into annular voids or perforations where it is desirable to have a controlled viscosity and set time to permit safe cement slurry placement, but also desirable to have the slurry set rapidly after placement. For example, to allow ample time for placement of cement formulations before set, retarders are frequently added to prevent the development of high viscosities or premature setting of cement slurry during the pumping and squeezing into the annular voids or perforations. Yet, these retarders can also delay the setting of the cement for long periods of time even after placement even under in situ conditions. Excessive set times contribute to high operational costs due to rig time standby. Thus, it is desirable that a compatible accelerator be employed in some fashion to greatly reduce the set time for the cement.

The same is true when setting cement in the form of plugs in the wellbore. This may be for plugging the well; formation pack off, or seal off between productive formations or otherwise; and/or for wellbore deviation. Frequently, the cement plug intermingles or becomes contaminated with the drilling fluid. The drilling fluid is an effective cement set retarder and prevents or delays the set of the cement plug. In any event, it is sometimes desirable that an over wash be provided to accelerate the set of the cement strength development without adversely affecting pumping time.

SUMMARY OF THE INVENTION

Accordingly, it is an object of the present invention to provide improved composition and method that will increase the rate of set of retarded cement regardless of what application it is employed in.

It is a specific object of this invention to provide a composition in which the drilling fluid can be converted to a cement which will set up within a desirable time after the cementitious material is added thereto.

These and other objects will become apparent from the descriptive matter which follows.

In a broad aspect of this invention, there is provided a compatible accelerator for accelerating the set strength development rate of a retarded cement in any application.

In accordance with one aspect of this invention, there is provided a method of accelerating the set of highly retarded cements by overwashing a retarded cement composition with a compatible accelerator that will decrease the setting time for the cement in annular voids or perforations and/or in a plug in a wellbore.

In accordance with another aspect of this invention, there is provided a cement composition for cementing any designated section of a wellbore wherein the space in the wellbore is occupied by a drilling fluid. The composition comprises a quantity of the drilling fluid containing viscosity control agents which serve as retarders when the cementitious material is added; a dry cement material, a dispersant, and an accelerator that is compatible.

By compatible accelerators is meant an accelerator that contains a material that will form formate ions without a violent reaction with basic cement slurry constituents in the cement slurry. We have obtained excellent results with formamide and know that it works regardless of whether or not the theory regarding formate ion is correct. Other sources of formate ion in cement slurry are salts of formic acid and esters of formic acid.

In another aspect, this invention provides a method for treating a well in which the subterranean formation about the well is fractured and a low viscosity, retarded cement slurry is applied to seal off annular voids and perforations There is also provided the method for improvement of washing over the cement with a solution of a compatible organic accelerator such as the material that will yield formate ions, as delineated hereinbefore.

In another aspect of this invention there is provided a method for accelerating a cement plug in a well completed in a subterranean formation where cement is pumped into the well and allowed to set to form a plug therewithin. The improvement comprises either washing over the cement plug with a solution of a compatible organic accelerator or pumping the plug into an interval of the well previously filled with the compatible organic accelerator The compatible organic accelerator is the material that will yield formate ions in the cement slurry, as delineated hereinbefore.

These compatible organic accelerators can be employed alone or in combination with other known accelerators, such as but not limited to those inorganic accelerators like silicates (sodium metasilicate, sodium silicate, or potassium silicate) or chlorides (sodium chloride, potassium chloride, or calcium chloride).

DESCRIPTION OF PREFERRED EMBODIMENTS

The conversion of well drilling fluids into cement slurries for the purposes of cementing in wellbores to casing annulus, and/or performing other wellbore cementing applications is attractive for several reasons; one of which would be that a major portion of the drilling fluid would not be subject to waste disposal regulations. Moreover, the conversion of drilling fluid to a cement slurry minimizes the handling of drilling fluid after completion of the well, and minimizes the cement expense, and the mud cement will effect a more nearly complete displacement of the drilling fluid.

The conversion of drilling fluid, or "mud" to a cement slurry is not without some operational problems and undesirable compositional changes. For example, the addition of cementitious material such as mixtures of lime, silica, alumina or lime and magnesia, silica and alumina and iron oxide, or cement materials such as calcium sulfate and Portland cement to aqueous drilling fluids can substantially increase the viscosity of the fluid mixture and cause severe flocculation. Efforts to circulate such mixtures through a wellbore can result in highly unsatisfactory circulation rates, restricting flow in the wellbore annulus, increasing pressures, resulting in breakdown of the earth formations in the vicinity of the wellbore. In addition, excessive viscosity contributes to failure of the surface operations to mix the cement slurry properly. Certain dispersants have been developed for use in these drilling fluids during the drilling operations. These include lignite, ligno-sulfonates, and polyacrylates. Other dispersants have been used; particularly, in the situation where it is desired to convert a drilling mud to a set cement. These other dispersants are discussed in co-pending application DP 50-5-980A, now Ser. No. 07/131,878.

It is well recognized by those skilled in the art that these normal constituents of drilling mud also act as retarders, which inhibit the setting of cement slurries. Specifically, it may take a week or longer for such converted drilling mud cements to set, and it is desirable to shorten this time.

It is believed helpful to discuss this conversion of drilling mud to cement in greater detail before looking at other embodiments for which this invention is useful. The process for converting a drilling mud to a cement slurry for cementing a well is discussed in the above-referenced Ser. No. 07/131,878, and does not require detailed explanation herein. Details of that application are included herein by reference. Expressed otherwise, the operation simply comprises a casing that is extended into a portion of the formation from a wellhead with a second casing extending into the formation further as a wellbore is deepened to form an annulus which may include washouts or void areas behind the casing. The casing is adapted to be in communication with the pump for circulating drilling fluid through the interior of the casing, up the annulus and through a return conduit to a storage tank or pit and is recirculated through the pump in normal drilling operations. Conventional drilling fluid conditioning devices such as shale shakers, sand separators and related equipment may be employed; but are normally not shown in schematic illustrations in the interest of clarity. One method for converting a drilling fluid into a cementitious slurry is the addition of premixed quantities from storage of dry blended cement formulation for conduction to a slurry mixing operation. The formulation is added to a slurry and mixed into the drilling fluid which is thereby converted into a cementitious slurry. It is at this point that it is convenient to add accelerators or the like to at least neutralize the adverse effects of the retarders that may have been present in the drilling fluid.

As described hereinbefore, compatible accelerators comprise the materials which will yield the formate ions. We know from experimental data that formamide will provide excellent results Other sources of formate ions that have been tried successfully include salts of formic acid, and esters of formic acid.

These materials are all discussed in HACKH'S Chemical Dictionary and do not require further description herein In this invention, a compatible accelerator is employed at a concentration in the range of from 0.05 to 2.5 gallons per barrel of cement slurry (gal/bbl). A better concentration is in the range of 0.3-1.2 gal/bbl. The concentration may vary from this for specific applications. For most applications, the optimum concentration is approximately 0.6 gal/bbl. This will result in a settling time for the cementitious slurry in approximately twenty-four hours, which is substantially shorter than the prior art retarded cements.

When employed in an over wash, the compatible accelerator is in a concentration within the range of 5 percent by weight to 100 percent by weight, the remainder, if any, being water.

As indicated, this invention is useful also when an over wash is employed after squeezing cement through perforations or in casing cracks A highly retarded cement may be emplaced and then washed over with a solution containing the compatible accelerator; for example, formamide. The differential pressure extended from the wellbore into the formation will force the liquid that is employed as the over wash solution containing the cement accelerator into the permeable cement matrix. Normally, such an over pressure is in the range of from 200–500 pounds per square inch (psi) greater in the well than it is in the formation so it tends to effect flushing of the over wash solution containing the cement accelerator through the hydrating cement matrix.

The compatible accelerator can be employed to mitigate adverse effects of contamination from in situ mixing with fluids, such as drilling fluids, in any application. Specifically, if too much retarder is put into a cement slurry, an effective amount of compatible accelerator can be employed to neutralize the retarder and get it back into the desired range.

In another operation, the solution containing the accelerator may be spotted below a cement to be placed in a well to form a plug. Thereafter a spot of liquid containing the cement accelerator may be positioned above the cement. A surfactant may be employed in a small concentration of about 0.1–1.0 percent (%), if desired, in the preflush, cement slurry, or overflush, to decrease the interfacial tension and help the surrounding fluids to penetrate into the cement matrix.

The accelerators have the property of accelerating the set of the cement and have the potential for immediate application in the conversion of mud to cement and as an over wash contaminate, or for washing an accelerating solution from both above and below to produce acceleration of cement nodes in remedial squeeze operations, cement plugs in plugback, kickoff, whipstock procedures, or cement at the top of liners after liner cementing operations.

EXAMPLE

The following example illustrates both a control without this invention and laboratory experiments performed to simulate field conditions and show effectiveness of the accelerator.

EXAMPLE I

In this example from 350 cubic centimeters (cc's), serving as an experimental one barrel quantity, of 10.45 pounds (lbs.) per gallon (ppg) Rapid Mud (a trademark of Baroid Corp) was employed with 175 cc's serving as 0.5 barrel of water, and 300 lbs. per barrel (coarse grind) Kaiser Cement in a quantity of 300 grams was employed with 2.25 lbs. per barrel (2.25 gram SSMA, which is sodium styrene maleic anhudride). The result was a retarded cement having a density of 12.3 pounds per gallon. This served as a base for comparison and had 0 psi and had not even set up after 4 days, but after 4.6 days it gave a comprehensive strength of 50 psi and after 11 days gave a compressive strength of 500 psi but the pumping time was still about 48+ hours at 94 degrees Fahrenheit.

In contrast, 350 cc's of 10.45 ppg Rapid Mud in 175 cc's water, giving 300 lbs, per barrel (coarse grind) Kaiser Cement with 3 gms.(lbs. per barrel) SSMA and 2.4 gal/bbl, or 20 ml., of formamide, gave a compressive strength of 50 psi (pounds per square inch) after only 18 hours; 460 psi after 4 days and 462 psi after 11 days. The pumping time remained unchanged at 48+ hours at 94 degrees Fahrenheit.

From the foregoing example, it can be seen that this invention achieves the objects delineated hereinbefore and particularly provides a means of accelerating cement slurry formulations that have been retarded wherever they are used.

What is claimed is:

1. In a method of treating cement in a well completed into subterranean formations for producing a desired hydrocarbonaceous fluid therefrom which includes the steps of:

a. squeezing highly retarded cement into said annular voids or perforations;

the improvement comprising:

washing over said cement with a solution of a compatible organic accelerator comprising a material that will produce a formate ion in the cement slurry and selected from the class consisting of formamide, formic acid, salt of formic acid, and ester of formic acid.

2. The method of claim 1 wherein said compatible organic accelerator is formamide.

3. The method of claim 2 wherein said formamide is present in a concentration within the range of 5 percent by weight to 100 percent by weight of over wash fluid.

4. The improved method of claim 1 wherein said compatible organic accelerator is selected from the class consisting of salts and esters of formic acid.

5. The method of claim 4 wherein said compatible cement accelerator is present in the concentration within the range of 5 percent by weight to 100 percent by weight of over wash fluid.

6. In a method of setting a volume of cement in a well completed in subterranean formations, in which a cement is or may become retarded and is pumped into said well and allowed to set to form a hard cementitious material therewithin, the improvement comprising:

contacting by admixing at the surface said cement with a solution of a compatible organic accelerator comprising material that will produce formate ions in the cement slurry; said compatible organic accelerator being formamide, said formamide being admixed with said cement slurry initially in a concentration within the range of 0.05–2.5 gallons of formamide per barrel of cement slurry.

7. The method of claim 6 wherein said ester of formic acid is present in the concentration of 0.05–2.5 gallons per barrel of cement slurry.

* * * * *